Figure 1:
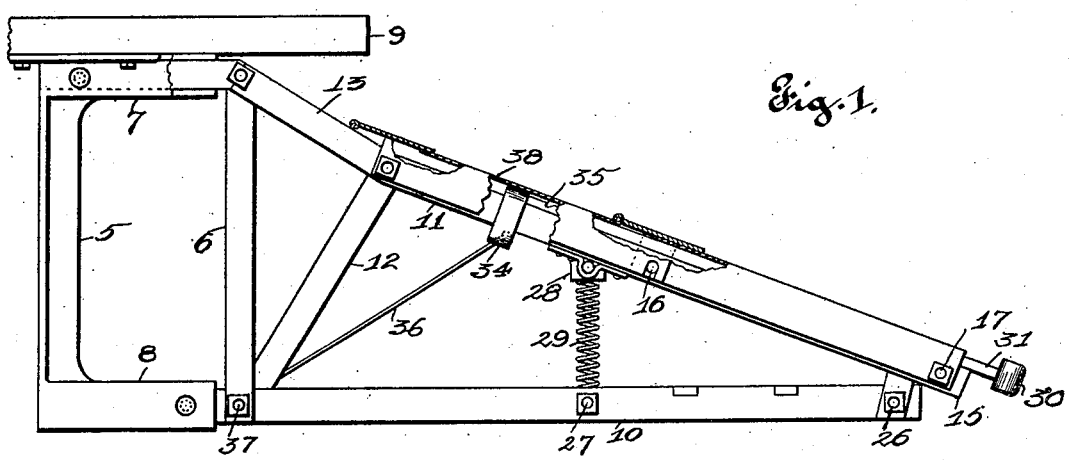

No. 705,886. Patented July 29, 1902.
J. W. WEHMEYER.
CAR FENDER.
(Application filed Feb. 24, 1902.)
(No Model.) 2 Sheets—Sheet 1.

Witnesses
Alfred O. Eicks
Frank Turner

Inventor
John W. Wehmeyer.
by Higdon & Longan Atty's

No. 705,886. Patented July 29, 1902.
J. W. WEHMEYER.
CAR FENDER.
(Application filed Feb. 24, 1902.)

(No Model.) 2 Sheets—Sheet 2.

UNITED STATES PATENT OFFICE.

JOHN WILLIAM WEHMEYER, OF ST. LOUIS, MISSOURI.

CAR-FENDER.

SPECIFICATION forming part of Letters Patent No. 705,886, dated July 29, 1902.

Application filed February 24, 1902. Serial No. 95,233. (No model.)

*To all whom it may concern:*

Be it known that I, JOHN WILLIAM WEHMEYER, of the city of St. Louis, State of Missouri, have invented certain new and useful Improvements in Automatic Car-Fenders, of which the following is a full, clear, and exact description, reference being had to the accompanying drawings, forming a part hereof.

My invention relates to automatic car-fenders; and it consists of the novel construction, combination, and arrangement of parts hereinafter shown, described, and claimed.

My object is to construct an automatic fender; and my invention consists of a suitable framework or pilot, said frame or pilot comprising vertical posts, horizontal arms extending forwardly from the lower ends of said vertical posts in a horizontal position, bifurcated inclined arms extending backwardly and upwardly from the forward ends of said horizontal arms, braces connecting the rear ends of said horizontal arms to the rear ends of said bifurcated inclined arms, second bifurcated inclined arms connecting the upper ends of said posts to the upper ends of said braces and to the rear ends of said first-mentioned bifurcated inclined arms, and a rod connecting the upper ends of said posts, a scoop pivotally mounted on said pilot, said scoop consisting of bars mounted in the spaces in said bifurcated arms, pivots inserted through said arms and through said bars near their rear ends, a rod connecting the forward ends of said pivoted bars, straps connected to said rod and extending backwardly, cross-pieces connecting said straps together, a rod connecting the rear ends of said straps, springs extending backwardly from said rod, a second rod connecting the rear ends of said springs, straps connecting said second rod with the rod connecting the upper ends of said posts, and cross-pieces connecting the last-mentioned straps, springs attached to the rear ends of said pivoted bars and to the frame, the tension of said springs being exerted to throw the forward ends of the pivoted bars upwardly, loops slidingly encircling the bifurcated arms and removably engaging the rear ends of the pivoted bars, as required to latch the scoop down in its normal position, arms slidingly mounted on top of the pivoted bars in position to engage said loops, said arms extending forwardly beyond the ends of the pivoted bars, and a feeler-bar connecting the forward ends of said sliding arms, so that when the feeler-bar strikes an obstruction the loops are pushed backwardly to release the rear ends of the pivoted bars and allow the forward end of the scoop to swing upwardly.

Figure 2:
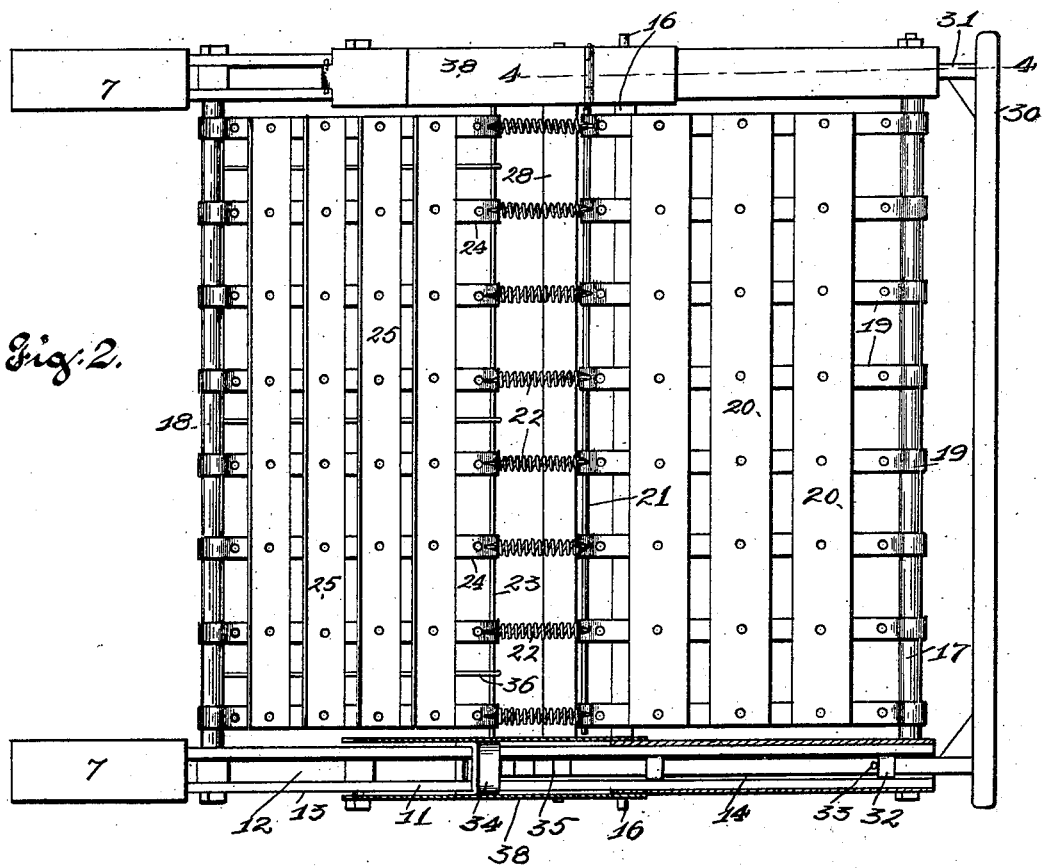
Figure 3:
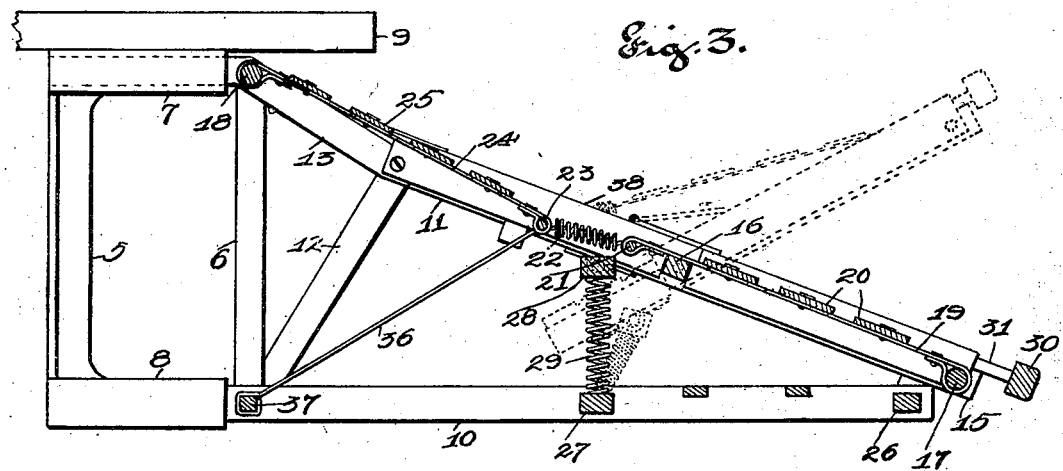
Figure 4:
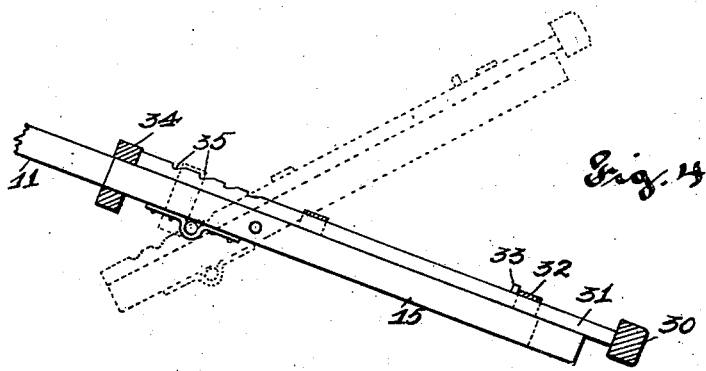

Figure 1 is a side elevation of a fender constructed in accordance with the principles of my invention. Fig. 2 is a top plan view of the parts shown in Fig. 1. Fig. 3 is a longitudinal vertical central section. Fig. 4 is a sectional detail on the line 4 4 of Fig. 2.

Referring to the drawings in detail, the framework or pilot consists of the vertical posts 5 and 6, framed together by the horizontal bars 7 and 8 and attached to the forward end of the car-bed 9. The arms 10 extend forwardly from the bars 8 in a horizontal position immediately above the track. The inclined arms 11 are attached to the forward ends of the arms 10 and extend backwardly and upwardly and are connected to the upper ends of the braces 12, and the arms 13 connect said braces 12 and said arms 11 to the forward ends of the bars 7. The arms 11 and 13 are bifurcated, as shown in Fig. 2, thus forming the spaces 14, and the bars 15 are mounted in said spaces 14 and secured to the arms 11 by the pivots 16. A rod 17 connects the forward ends of the pivoted bars 15. A second rod 18 connects the forward ends of the bars 7, the upper ends of the posts 6, and the rear ends of the arms 13.

The scoop consists of the straps 19, having bearings in their forward ends, through which the rod 17 extends, the cross-pieces 20, secured to said straps to hold the straps suitable distances apart and form an apron, the rod 21, inserted through bearings in the rear ends of said straps, the springs 22, extending backwardly from the rod 21, the rod 23, attached to the rear ends of the springs 22, the straps 24, attached to the rod 23 and having bearings in their rear ends through which the rod 18 is inserted, and the cross-pieces 25, attached to said straps 24 to hold them suitable distances apart and form an apron similar to the first apron. The cross-pieces 26 connect the forward ends of the arms 10, and similar cross-pieces 27 connect the centers of said arms. The cross-pieces 28 connect the rear ends of the pivoted bars 15 to said cross-pieces 28, being in vertical alinement with the cross-pieces 27, and the retractile coil-spring 29 connects the piece 28 to the piece 27, as required, to pull the rear ends of the bars 15 downwardly and throw the forward ends of said bars upwardly, as indicated in dotted lines in Figs. 3 and 4. The tension of the springs 22 pulling upwardly and backwardly on the rod 17 assists the springs 29 in throwing the forward ends of the bars 15 upwardly, and said bars form the framework of the scoop. The feeler-bar 30 has arms 31, slidingly mounted on top of the pivoted bars 15. The loops 32 are attached to the pivoted bars 15 and encircle the arms 31 to serve as guides and hold the arms in position, and the pins 33 extend upwardly from the arms 31 to engage the loops 32 and serve as stops to limit the forward motion of the feeler-bar. Loops 34 encircle the bifurcated arms 11 and the rear ends of the pivoted bars 15, as required, to hold the pivoted bars 15 in their normal positions in the spaces 14, and the rear ends of the sliding arms 31 engage the loops 34, as required, to push said loops backwardly and release the pivoted bars 15, as shown in Fig. 4. Notches 35 are formed in the upper face and rear end of each of the sliding arms 31, so that when the scoop has been tripped and swings upwardly, as shown in dotted lines in Fig. 4, the loops 34 may slide forwardly and engage in said notches 35 to hold the scoop in its elevated position. The sliding loops 34, engaging the rear ends of the pivoted bars 15, form latches to hold the scoop downwardly in its normal position.

The braces 36 connect the rod 23 to the cross-piece 37, and said cross-piece connects the rear ends of the arm 10, the object of said braces being to hold the forward end of the rear apron from swinging upwardly. The sheet-metal channel-bars 38 cover the bifurcated arms 11 and 13 to present a smooth finished appearance.

In the practical operation of my fender if a person is standing on the track the feeler-bar 30 will strike the person or obstruction, press the arms 31 backwardly, thus moving the loops 34 out of engagement with the rear ends of the pivoted bars 15, the springs 22 and 23 will operate the scoop-frame to throw the forward end of the scoop upwardly, as shown in dotted lines in Fig. 3, and it is presumed that the person will fall upon the aprons of the scoop. The springs serve to make the scoop yielding.

I claim—

1. In an automatic fender, a suitable framework or pilot having bifurcated inclined arms extending backwardly and upwardly from its forward end; bars mounted in the spaces in said bifurcated arms; pivots inserted through said arms and through said bars near their rear ends; a rod connecting the forward ends of said pivoted bars; an apron attached to said rod and extending backwardly and attached to the frame; springs attached to the rear ends of said pivoted bars and to the frame; the tension of said springs being exerted to throw the ends of the pivoted bars upwardly; loops slidingly encircling the bifurcated arms and removably engaging the rear ends of the pivoted bars as required to latch the scoop down in its normal position; arms slidingly mounted on top of the pivoted bars in position to engage said loops and extending forwardly beyond the ends of the pivoted bars; and a feeler-bar connecting the forward ends of said sliding arms, substantially as specified.

2. In an automatic fender, a suitable framework or pilot; said frame or pilot comprising vertical posts, horizontal arms extending forwardly from the lower ends of said vertical posts in a horizontal position, bifurcated inclined arms extending backwardly and upwardly from the forward ends of said horizontal arms, braces connecting the rear ends of said horizontal arms to the rear ends of said bifurcated inclined arms, second bifurcated inclined arms connecting the upper ends of said posts to the upper ends of said braces, and to the rear ends of said first-mentioned bifurcated inclined arms, and a rod connecting the upper ends of said posts; a scoop pivotally mounted on said pilot; said scoop consisting of bars mounted in the spaces in said bifurcated arms, pivots inserted through said arms and through said bars near their rear ends, a rod connecting the forward ends of said pivoted bars, straps connected to said rod and extending backwardly, cross-pieces connecting said straps together, a rod connecting the rear ends of said straps, springs extending backwardly from said rod, a second rod connecting the rear ends of said springs, straps connecting said second rod with the rod connecting the upper ends of said posts, and cross-pieces connecting the last-mentioned straps; springs attached to the rear ends of said pivoted bars and to the frame, the tension of said springs being exerted to throw the forward ends of the pivoted bars upwardly; loops slidingly encircling the bifurcated arms and removably engaging the rear ends of the pivoted bars as required to latch the scoop down in its normal position; arms slidingly mounted on top of the pivoted bars in position to engage said loops said arms extending forwardly beyond the ends of the pivoted bars; and a feeler-bar connecting the forward ends of said sliding arms; so that when the feeler-bar strikes an obstruction the loops are pushed backwardly to release the rear ends of the pivoted bars and allow the forward end of the scoop to swing upwardly, substantially as specified.

In testimony whereof I affix my signature in presence of two witnesses.

JOHN WILLIAM WEHMEYER.

Witnesses:
E. E. LONGAN,
ALFRED A. EICKS.